United States Patent [19]

Nakajima et al.

[11] 3,923,309

[45] Dec. 2, 1975

[54] CARTRIDGE SHELL FOR PHONOGRAPH PICKUP

[75] Inventors: Heitaro Nakajima; Hirotake Kawakami, both of Tokyo; Shokichi Tatara, Yokohama; Jun Kishigami, Tokorozawa, all of Japan

[73] Assignee: Sony Corporation, Tokyo, Japan

[22] Filed: July 17, 1974

[21] Appl. No.: 489,073

[30] Foreign Application Priority Data

July 21, 1973 Japan ................................ 48-85141

[52] U.S. Cl. .................................. 274/23 R; 274/37

[51] Int. Cl.$^2$ .............................................. G11B 3/10

[58] Field of Search ................ 274/23 R, 37; 264/29

[56] References Cited

UNITED STATES PATENTS

| | | | |
|---|---|---|---|
| 1,321,178 | 11/1919 | Wolff | 274/23 R |
| 3,328,037 | 6/1967 | Lehmann | 274/23 R |
| 3,556,537 | 1/1971 | Stacy | 274/23 R |

*Primary Examiner*—Richard E. Aegerter
*Assistant Examiner*—Charles E. Phillips
*Attorney, Agent, or Firm*—Hill, Gross, Simpson, Van Santen, Steadman, Chiara & Simpson

[57] ABSTRACT

A cartridge shell for a phonograph pickup consisting of an integral cartridge mounting portion and a tone-arm mounting portion, the shell being formed of carbonaceous fibers bonded together by means of a resin.

6 Claims, 9 Drawing Figures

CARTRIDGE SHELL FOR PHONOGRAPH PICKUP

BACKGROUND OF THE INVENTION

1. Field of the Invention

This invention relates to a cartridge shell for mounting a cartridge used in a phonograph record player and specifically involves the use of a material of construction which provides the shell with improved stiffness and frequency response.

2. Description of the Prior Art

The typical phonograph pickup system employs a tone arm which is pivotally supported on a fulcrum, and carries a cartridge from which there is a depending cantilever which carries a stylus. Generally, the shell in which the phonograph cartridge is mounted is composed of steel or aluminum, but these materials have the disadvantage that their rigidity is not relatively high, and they do not have suitable vibration damping properties.

SUMMARY OF THE INVENTION

The present invention is directed to a cartridge shell for a phonograph pickup which is composed of carbonaceous fibers bonded together by means of a synthetic resin, such as a thermosetting epoxy or phenolic resin. The term "carbonaceous fibers" is meant to include the high modulus fibers which are currently available and which may be carbon or graphite. The cartridge shell of the present invention has a resonant frequency such that it does not pick up noise components due to the presence of a warped or otherwise eccentric record. The cartridge shell of the present invention has a high degree of rigidity and a high internal loss so that the cartridge does not produce resonance phenomenon in the middle sound range among the frequency band of a reproduced signal. The cartridge shell of the present invention is also capable of being mass produced and is relatively inexpensive.

The cartridge shell of the present invention may be produced as a molded integral product or as a laminated product from plies of carbonaceous fibers containing a thermosetting resin.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
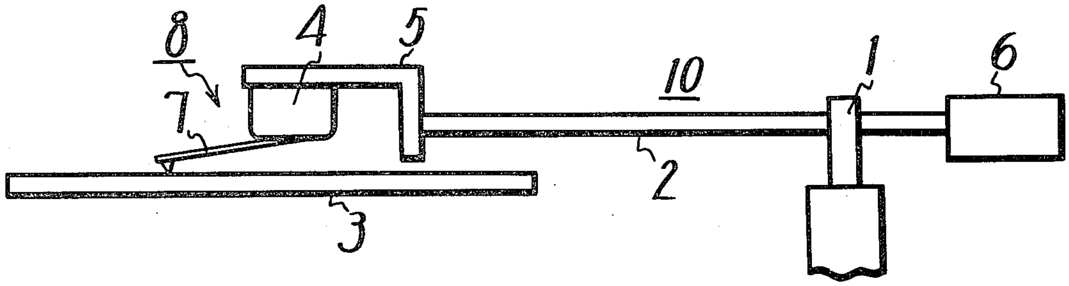
FIG. 1 (PRIOR ART)
FIG. 1 is a somewhat schematic side elevational view showing a conventional phonograph pickup assembly.
Figure 2:
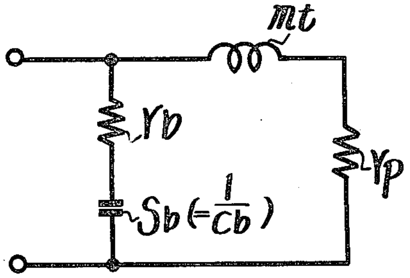
FIG. 2 is a circuit diagram of the equivalent circuit of a vibrating system used to pick up a low frequency sound.
Figure 3:
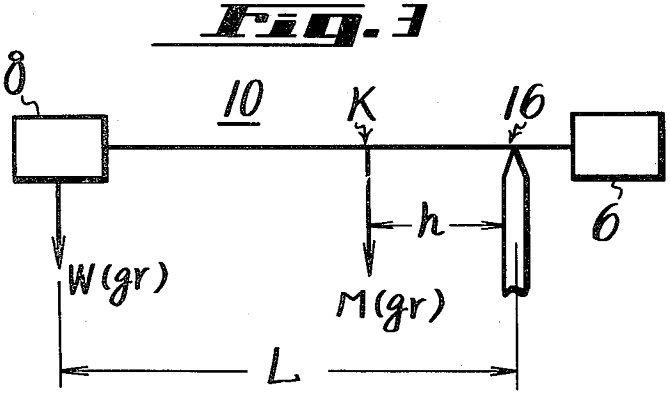
FIG. 3 is a schematic diagram illustrating the pickup shown in FIG. 1 as a physical pendulum.

The physical problems involved in phonograph tone arms will be described in conjunction with FIGS. 1 to 3, inclusive. In FIG. 1, reference numeral 10 indicates generally a pickup system of the type commonly used in modern day phonographs. A tone arm 2 is pivotally supported by means of a fulcrum 1. A cartridge 4 is secured to a cartridge shell 5 which is connected to the tone arm. At the opposite end of the tone arm 2 there is mounted a counterweight 6. A cantilever 7 is connected to the cartridge 4 and carries a stylus for engaging the grooves of a record member 3. The reference numeral 8 has been applied to the entire pickup head assembly including the cartirdge 4, the shell 5 and the cantilever 7.

When a sound signal on the record disc 3 is picked up by the pickup assembly 10, the quality of reproduction is dependent to a significant degree upon the characteristics of the shell 5. The lower limit of the low frequency range will to a large extent be determined by the arm resonance frequency $f_L$. The equivalent circuit for a vibrating system for picking up low frequency sounds is shown in FIG. 2. In that Figure, reference character $m_t$ represents the equivalent mass of the tone arm 2 including the cartridge 4 and the head shell 5, and $r_p$ the equivalent resistance of the tone arm 2 at its fulcrum 1. Reference character $r_b$ denotes an equivalent resistance of the armature supporting portion and $S_b$ denotes an equivalent stiffness of the armature supporting portion. As apparent from FIG. 2, the low sound range reproduction limit frequency $f_L$ is expressed as follows:

$$f_L = \frac{1}{2\pi \quad m_t \cdot C_b} \qquad (1)$$

where $C_b$ represents the compliance.

It will be noted that if the stiffness $S_b$, which represents the conformability of the cartridge 4 is made constant, the limit frequency $f_L$ is determined by the equivalent mass $m_t$ of the tone arm 2 including the shell 5 and the cartridge 4. The equivalent mass $m_t$ refers to the equivalent mass of the whole pickup system 10 viewed from the stylus tip of the cartridge 4. For convenience in explanation, it will be considered that the tone arm 2 is represented by the mass $M_h$ of the pickup head 8 and the mass $M_w$ of the counterweight 6, respectively, as shown in FIG. 3. The equivalent mass $m_t$ in the case of a light stylus tip is approximately expressed as follows:

$$m_t = M_h \left(1 + \frac{M_h}{M_w}\right) \qquad (2)$$

Since the mass $M_w$ of the counterweight 6 is usually 2 to 5 times as much as the mass $M_h$ of the pickup head 8, the equivalent mass $M_t$ may be substantially represented by the mass $M_h$ of the pickup head 8. However, the pickup head 8 includes the shell 5 and a cartridge 4 mounted to the former as shown in FIG. 1. The mass of the cartridge 4 is normally about 8 grams and the mass of the shell is usually about 10 grams. Therefore, the equivalent mass $m_t$ will vary according to the variation of the mass of the shell 5 and hence the low limit frequency $f_L$ affecting the low frequency characteristics of the pickup system is greatly dependent upon the magnitude of the mass of the shell 5. The limit frequency $f_L$ is desirably selected to be in the neighborhood of 10 Hertz so that the cartridge 4 does not pick up noise components which are produced due to warping of eccentricity of the recording disc 3 and usually distributed in the frequency range of 1 to a few Hertz. If the shell 5 is formed of a material such as iron or aluminum and weighs about 10 grams and a cartridge 4 of high compliance is used, the limit frequency $f_L$ will be lowered as apparent from equation (1). The limit frequency may be as low as 3 to 5 Hertz, so that noise components can not be effectively eliminated.

The magnitude of the equivalent mass $m_t$ is also affected by the conformability of the pickup system. In the case where the pickup system is regarded as a physical pendulum shown in FIG. 3, the period T in seconds of the tone arm 2 can be expressed as follows:

$$T = 2\pi \quad \frac{I}{M \cdot g \cdot h} \qquad (3)$$

where M in grams is the static mass of the whole pickup, I in gram centimeter$^2$ is the moment of inertia about a fulcrum 16, $h$ is the center of distance between the center of gravity K and the fulcrum 16, and $g$ in centimeters per second squared is the acceleration due to gravity. If the stylus pressure is taken as W grams, and the distance between the stylus and the fulcrum 16 as L centimeters, and the radius of gyration as $k$ in centimeters, the distance $h$ and the moment of inertia I can be expressed as follows:

$$h = WL/M$$

$$I = M\,(k^2 + h^2)$$

As a result, equation (3) can be rewritten as follows:

$$T = 2\pi \sqrt{\frac{k^2 + \left(\frac{WL}{M}\right)^2}{g\left(\frac{WL}{M}\right)}} \qquad (4)$$

If there are two pickup systems, and the stylus pressure W and the distance L between the stylus tip and the fulcrum are exactly the same for both systems but the total static mass of the pickup systems is different from each other and are represented by $M_1$ and $M_2$, the ratio of the periods $T_1$ and $T_2$ is expressed from equation (4) as follows:

$$\frac{T_1}{T_2} \cong \sqrt{\frac{k_1^2 + \left(\frac{WL}{M_1}\right)^2}{k_2^2 + \left(\frac{WL}{M_2}\right)^2} \cdot \frac{M_1}{M_2}}$$

where $k_1$ and $k_2$ are respectively the radii of gyration about the center of gravity of each system. In this case, since $k_1$ is ~~much~~ greater than $WL/M_1$ and $k_2$ is much greater than $WL/M_2$ and $k_1$ is substantially equal to $k_2$, the following approximation is obtained:

$$\frac{T_1}{T_2} \cong \sqrt{\frac{M_1}{M_2}} \qquad (5)$$

As apparent from equation (5), the smaller the total equivalent mass $m_t$ of a tone arm is, the quicker is the response. That is, the conformability is improved and the reproduction from the recording disc 3 improves. In view of the above, the mass of the shell 5 should be quite small.

With an acoustic device such as a record player or the like, it is well known that the greater the internal loss of vibrational energy is, the greater is the attenuation and the absorption of vibrational energy. Thus, if an external vibratory energy is delivered to the shell 5 which has a small internal loss, the vibration cannot be effectively removed, and the reproduction characteristic of the system is adversely affected.

As described above, in order to obtain an acoustically and physically superior pickup, the shell 5 must be light in weight and have a large internal loss. Accordingly, a shell formed by a material such as iron, aluminum or the like as in the prior art is not satisfactory for this purpose. Furthermore, in addition to the aforementioned construction, if the rigidity of the shell 5 is not relatively high, a resonance phenomenon or dip occurs at a frequency in the middle sound range of the frequency band being reproduced. Therefore, in order to remove these phenomenon, the rigidity must be increased.

Figure 4:
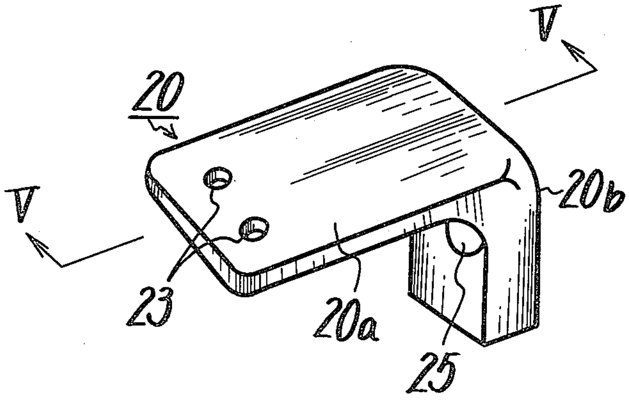
FIG. 4 is a view in perspective of a cartridge shell according to the present invention.
Figure 5:
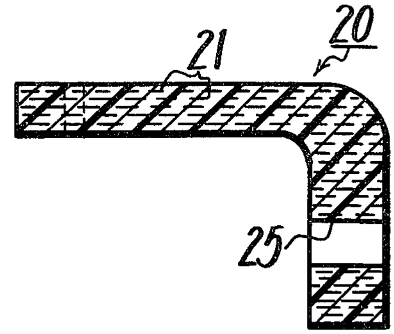
FIG. 5 is a cross-sectional view taken substantially along the line V—V of FIG. 4.

In accordance with the present invention as shown in FIG. 4, a shell 20 is formed by a composite member made of carbonaceous fibers having high rigidity and small specific gravity, bonded together with a synthetic resin such as a phenolic resin, an epoxy resin, or the like as a binding agent. The shell 20 is formed from a large number of fine carbon fibers 21 as depicted in FIG. 5, each having a diameter of about 7 microns and being from 3 to 4 millimeters in length. The composite member may be formed in a mold and has a substantially L-shaped cross-section consisting of a plate-like cartridge mounting portion 20*a* and an arm mounting portion 20*b* which is perpendicular to the former and is provided therethrough with a bore 25 for mounting the tone arm. The cartridge mounting portion 20*a* includes apertures 23 for mounting the cartridge. The arm mounting portion 20*b* is preferably made thicker than the cartridge mounting portion 20*a* so as to increase its strength. The cross-section of the shell is illustrated in FIG. 5.

Figure 6:
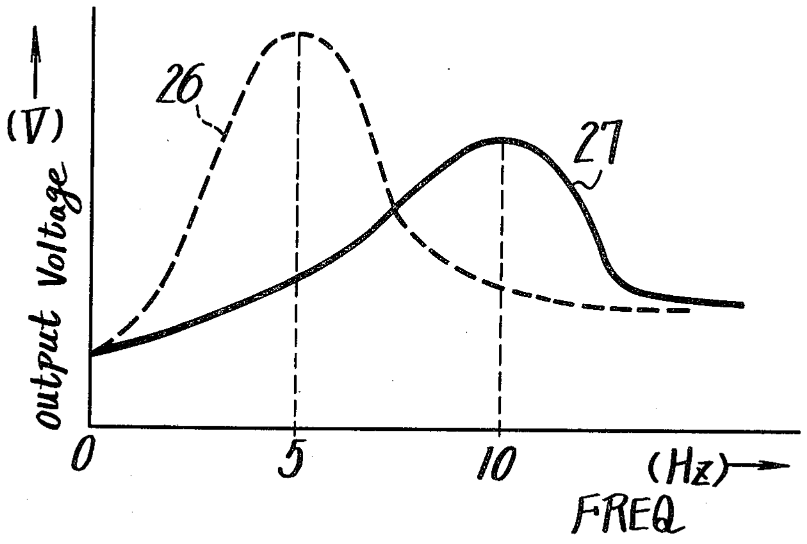
FIG. 6 is a graph comparing the low frequency response of the shell of the present invention with prior art shells.

The formed shell 20 has a modulus of longitudinal elasticity of about 9,000 kilograms per square millimeter while a prior art shell composed, for example, of aluminum alloy has a modulus of about 7,000 kilograms per square millimeter so that the shell 20 produced according to this invention is greater in rigidity than the latter. Further, the specific gravity of the newly developed shell is 1.4, whereas that of the aluminum alloy is about 2.7 so that the specific gravity of the new shell is about ½ of aluminum and the mass of the shell 20 can be reduced to ½ or less compared with a prior art shell having the same shape. The equivalent mass $m_t$ is thus decreased and the frequency limit $f_L$ expressed by equation (1) becomes higher. Thus, even though a cartridge of high compliance is used, the equivalent mass $m_t$ can be reduced satisfactorily. In the case of a prior art shell made of a metal such as aluminum, the limit frequency is about 5 Hertz, as shown by curve 26 in FIG. 6. In the case of using the shell according to the present invention, the limit frequency is about 10 Hertz as shown by curve 27 and hence noise components caused by warping or eccentricity of a record disc can be effectively eliminated.

Figure 7:
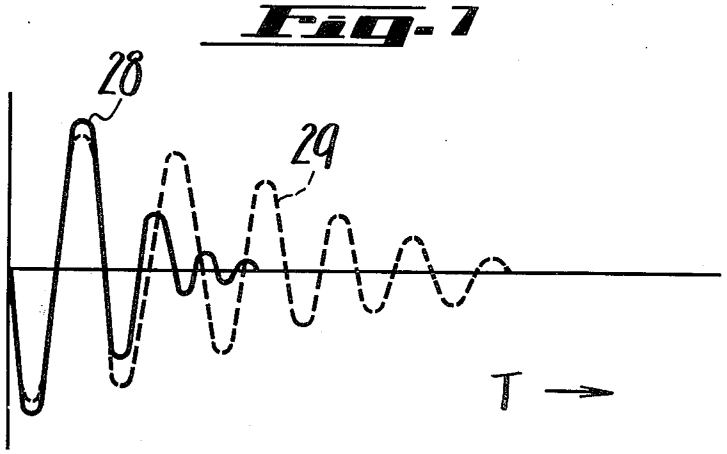
FIG. 7 is a graph illustrating the attenuation characteristics of the shell of the present invention as compared to shells of the prior art.

Since the equivalent mass of the pickup system is quite small, the pendulum period T expressed by equation (5) can become small, thereby improving the conformability of the tone arm so that a high compliance cartridge having good trackability can be obtained, together with high fidelity reproduction. With a shell composed of carbonaceous fibers and synthetic resin, even if external vibration energy is transmitted to the shell, the energy will be absorbed or attenuated between the carbon fibers or between the carbon fibers and the synthetic resin. Since this construction evidences a substantial internal loss even if external sound such as shock sound is received, its attenuation characteristic provides substantial damping as shown by a curve 28 in FIG. 7. On the other hand, when the shell is formed of aluminum or the like in the prior art, the attenuation characteristic is not nearly as pronounced, as shown by the curve 29 in FIG. 7. Consequently, with the shell of the present invention, its internal loss is improved by a factor of 3 to 4 times as much as that of the prior art, and the reproduction characteristic of the entire pickup system is improved.

Figure 8:
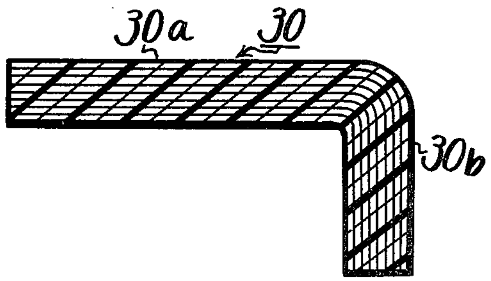
FIG. 8 is a cross-sectional view illustrating another form of cartridge shell produced according to this invention.
Figure 9:
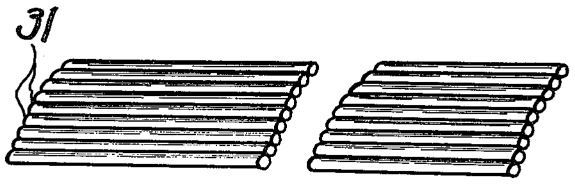
FIG. 9 is an enlarged perspective view of the preimpregnated sheets of carbonaceous fibers used to form the shell shown in FIG. 8.

FIG. 8 illustrates another example of the present invention. There is shown a shell 30 composed of a flat portion 30*a* for mounting a cartridge and a pickup arm mounting portion 30*b*. The shell 30 is formed from starting material shown in FIG. 9, consisting of aligned carbonaceous fibers 31 each being about 7 microns in diameter and about 40 millimeters in length which are held together with a thermosetting resin such as an epoxy resin to form a so-called pre-impregnated sheet. About 10 plies of these sheet-like members can be laminated and placed in a mold for thermal compression. If the directions of fiber lay are changed in the pre-impregnated sheet to laminate the carbon fibers in different directions, the rigidity is even more increased.

While a few embodiments of the invention have been illustrated and described in detail, it should be understood that the invention is not limited to these embodiments.

We claim as our invention:

1. A cartridge shell for use with a phonograph, said cartridge shell being mounted on one end of a tone arm and said shell supporting a phonograph cartridge, said shell being composed of carbon fibers bonded together by means of a synthetic resin, said shell possesses a high internal loss so that said shell effectively damps vibrations, is light in weight to provide quick response, and reduces resonance phenomena with high rigidity.

2. The cartridge shell of claim 1 in which said resin is a thermosetting resin.

3. The cartridge shell of claim 1 in which said shell has a cartridge mounting portion and a tone-arm mounting portion disposed at an angle of substantially 90° to each other.

4. The cartridge shell of claim 3 in which said tone-arm mounting portion is thicker than said cartridge mounting portion.

5. The cartridge shell of claim 1 in which said cartridge shell is composed of a laminate of sheets containing carbon fibers bonded by a thermosetting resin.

6. The cartridge shell of claim 1 wherein said carbon fibers are aligned.

* * * * *